United States Patent
Vuorinen et al.

(10) Patent No.: US 10,849,279 B2
(45) Date of Patent: Dec. 1, 2020

(54) HYDROPONIC INDOOR GARDENING METHOD

(71) Applicant: PLANTUI OY, Turku (FI)

(72) Inventors: Kari Vuorinen, Turku (FI); Janne Loiske, Kaarina (FI); Matti Alen, Salo (FI)

(73) Assignee: PLANTUI OY, Turku (FI)

( * ) Notice: Subject to any disclaimer, the term of this patent is extended or adjusted under 35 U.S.C. 154(b) by 782 days.

(21) Appl. No.: 15/300,160

(22) PCT Filed: Mar. 26, 2015

(86) PCT No.: PCT/EP2015/056528
§ 371 (c)(1),
(2) Date: Sep. 28, 2016

(87) PCT Pub. No.: WO2015/144812
PCT Pub. Date: Oct. 1, 2015

(65) Prior Publication Data
US 2017/0150684 A1  Jun. 1, 2017

(30) Foreign Application Priority Data

Mar. 28, 2014 (DK) .............................. 2014 00054
Mar. 28, 2014 (DK) .............................. 2014 00055
Mar. 31, 2014 (EP) .................................. 14162567

(51) Int. Cl.
*A01G 7/04* (2006.01)
*A01G 31/00* (2018.01)

(52) U.S. Cl.
CPC ............. *A01G 7/045* (2013.01); *A01G 31/00* (2013.01); *Y02P 60/146* (2015.11)

(58) Field of Classification Search
CPC ............. A01G 7/04; A01G 7/045; A01G 7/06
USPC ...................... 47/60, 62 A, 62 C, 62 R, 62 E
See application file for complete search history.

(56) References Cited

U.S. PATENT DOCUMENTS

| | | | | |
|---|---|---|---|---|
| 3,395,487 A | * | 8/1968 | Long ........................ | A01G 7/04 47/58.1 R |
| 4,060,933 A | * | 12/1977 | Kadkade ................ | A01G 7/045 47/58.1 R |
| 4,788,793 A | * | 12/1988 | Kadkade ................ | A01G 7/045 47/58.1 R |

(Continued)

FOREIGN PATENT DOCUMENTS

| | | |
|---|---|---|
| CN | 201726723 U | 2/2011 |
| CN | 102057867 A | 5/2011 |

(Continued)

OTHER PUBLICATIONS

"Photothermal Model of Plant Development" by Sysoeva & Markovskaya (Russian Journal of Developmental Biology vol. 37(1) pp. 16-21 (Year: 2006).*

(Continued)

*Primary Examiner* — Ebony E Evans
(74) *Attorney, Agent, or Firm* — Oliff PLC

(57) ABSTRACT

A hydroponic method of growing plants from seeds. In the method, different growth phases are carried out under different photosynthetic photon flux densities and, preferably, under specifically adjusted ratios of red, blue, green, and, optionally, yellow light to one another. In some embodiments, irrigation is achieved by the ebb and flow phenomenon.

20 Claims, 3 Drawing Sheets

(56) References Cited

U.S. PATENT DOCUMENTS

| | | | | |
|---|---|---|---|---|
| 5,525,860 | A * | 6/1996 | Horaguchi | H01J 61/44 313/486 |
| 5,818,734 | A * | 10/1998 | Albright | A01G 9/26 700/306 |
| 7,022,524 | B1 | 4/2006 | Phillips et al. | |
| 8,232,380 | B2 | 7/2012 | Kwok et al. | |
| 8,426,676 | B2 | 4/2013 | Oswald et al. | |
| 9,060,468 | B2 * | 6/2015 | Klase | F21V 5/007 |
| 9,131,645 | B2 * | 9/2015 | Karpinski | A01G 7/045 |
| 9,392,753 | B2 * | 7/2016 | Krijn | A01G 7/045 |
| 9,429,521 | B2 * | 8/2016 | Kramer | G01N 21/6408 |
| 9,526,215 | B2 * | 12/2016 | Suntych | A01G 7/045 |
| 9,851,062 | B1 * | 12/2017 | Davis | F21S 2/005 |
| 10,433,492 | B2 * | 10/2019 | Sulejmani | A01G 7/045 |
| 2004/0109302 | A1 | 6/2004 | Yoneda et al. | |
| 2007/0271842 | A1 | 11/2007 | Bissonnette et al. | |
| 2009/0151248 | A1 | 6/2009 | Bissonnette et al. | |
| 2012/0240462 | A1 * | 9/2012 | Ogawa | A01G 7/02 47/58.1 SE |
| 2013/0264934 | A1 * | 10/2013 | Osaki | A01G 7/045 313/46 |
| 2014/0075841 | A1 * | 3/2014 | Degraff | A01G 31/02 47/62 A |
| 2014/0144080 | A1 * | 5/2014 | Gidekel | A01G 31/06 47/62 R |
| 2014/0215915 | A1 * | 8/2014 | Suzuki | A01G 7/045 47/58.1 LS |
| 2014/0215916 | A1 * | 8/2014 | Ara | A01H 3/02 47/58.1 LS |
| 2015/0150203 | A1 * | 6/2015 | Thakur | A01G 9/16 47/62 R |
| 2016/0007543 | A1 * | 1/2016 | Takashima | A01G 22/00 47/58.1 LS |
| 2017/0273312 | A1 * | 9/2017 | Martinez-Barbreau | C05F 11/10 |
| 2019/0373817 | A1 * | 12/2019 | De Samber | A01G 9/12 |

FOREIGN PATENT DOCUMENTS

| | | |
|---|---|---|
| JP | 2004-081110 A | 3/2004 |
| JP | 2010-220493 A | 10/2010 |
| JP | 2013-215145 A | 10/2013 |
| WO | 2008/048080 A1 | 4/2008 |
| WO | 2014/037852 A1 | 3/2014 |

OTHER PUBLICATIONS

Nov. 2, 2018 Office Action issued in Chinese Patent Application No. 201580029179.6.

Aug. 5, 2016 Office Action issued in European Patent Application No. 14 162 567.3.

Jun. 16, 2015 International Search Report issued in International Patent Application No. PCT/EP2015/056528.

Jun. 16, 2015 Written Opinion of the International Searching Authority issued in International Patent Application No. PCT/EP2015/056528.

* cited by examiner

HYDROPONIC INDOOR GARDENING METHOD

FIELD OF THE INVENTION

The present invention relates to a hydroponic method of growing plants from seeds.

BACKGROUND OF THE INVENTION

Nowadays it is becoming more and more popular to grow plants indoors for food and decorative purposes. Consequently, various gardening and plant growing devices are available.

Typically, beginners may prefer buying already-grown flowers and kitchen plants such as herbs. Devices are provided for prolonging the life of the kitchen plants but in most of the cases they can be maintained viable from a couple of days to some weeks, at maximum.

More advanced cultivators may prefer growing plants from seed. However, domestic indoor temperature and lighting conditions are not suitable for obtaining strong, sturdy and viable seedlings. Thus, more sophisticated growing methods and devices are needed in order to meet plants' requirements and to obtain vigorous seedlings and mature plants.

Hydroponics means the cultivation of plants without soil in a liquid solution of water and nutrients. Unfortunately, currently available hydroponic methods and devices suffer from several disadvantages. Often the devices are non-aesthetic or loud, or they provide only suboptimal lighting conditions. Furthermore, the devices are directed to most advanced cultivators and require special skills.

Thus, a need exists in the art for even more sophisticated but simple and/or automated methods and devices for indoor gardening.

BRIEF DESCRIPTION OF THE INVENTION

In one aspect, the present invention provides a hydroponic method of growing a plant from seed indoors. The method comprises the steps of i) providing a seed; ii) germinating the seed under a photosynthetic photon flux density (PPFD) of of 40 to 140 $\mu$mol m$^{-2}$ s$^{-1}$; iii) growing the germinated seed into a seedling under a PPFD of 190 to 450 $\mu$mol m$^{-2}$ s$^{-1}$; iv) growing the seedling into a mature plant through a vegetative phase under a PPFD of 210 to 450 $\mu$mol m$^{-2}$ s$^{-1}$, and further through a strong vegetative phase under a PPFD of 230 to 700 $\mu$mol m$^{-2}$ s$^{-1}$; and v) preserving the mature plant under PPFD of 30 to 150 $\mu$mol m$^{-2}$ s$^{-1}$.

Depending on the plant to be grown the method may comprise further steps of growing the mature plant through a flowering phase under PPFD of 240 to 700 $\mu$mol m$^{-2}$ s$^{-1}$ and/or growing the mature plant through a generative phase under PPFD of 240 to 460 $\mu$mol m$^{-2}$ s$^{-1}$.

Some specific embodiments of the invention are set forth in the dependent claims.

Other objects, embodiments, details and advantages of the present invention will become apparent from the following drawings, detailed description and examples.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Figure 1:
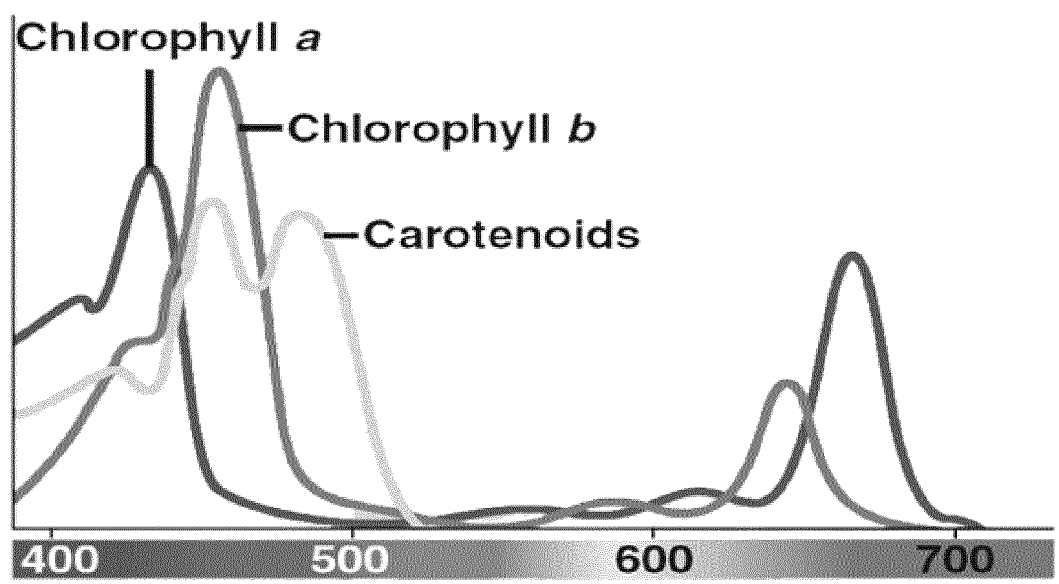
FIG. 1 is a schematic presentation of absorption spectra of photosynthetic plant pigments.

The present invention relates to a hydroponic method of growing plants such as leafy greens, vegetable-like fruits, other fruits, or flowers in end user environments, such as homes, restaurants, and institutional kitchens.

As used herein, the term "leafy greens" refers to plants whose leaves and stems are used as food. This term includes vegetable greens or leafy vegetables such as lettuce (e.g. cutting lettuce, batavia lettuce, stem lettuce, iceberg lettuce, and roman lettuce), spinach (e.g. baby spinach and New Zealdn spinach), bok Choy, tatsoi, mizuna, komatsuna, shiso, mangold, and herbs such as rucola (e.g. rocket rock), basil (e.g. vanilla basil, cinnamon basil, lemon basil, red basil, Thai basil, and bush basil), thyme, parsley, mint (e.g. green mint, peppermint, and apple mint), rosemary, coriander, marjoram, oregano, and sage.

As used herein, the term "vegetable-like fruits" refers to plants that are used like vegetables but botanically are fruits. Non-limiting examples of such plants include tomato, cucumber, paprika, and chili pepper.

As used herein, the term "plants requiring intensive light" refers to vegetable-like fruits, other fruits and plants, such as medicinal cannabis, which require intensive light for their development, growth, and well-being.

Suitable flowers to be grown by the present method include but are not limited to annual flowers such as violet (e.g. horned violet, sweet violet, and wild pansy), American saffron, cornflower, and marigold flower.

As used herein, the term "hydroponics" refers to a method of growing plants without soil in a liquid solution of water and nutrients. In soil-less culture, artificial medium may be used to provide mechanical support for the seed to be germinated and any seedling or mature plant developed therefrom.

As used herein, the term "aeroponics" refers to a sophisticated form of hydroponics wherein a nutrient dense mist, i.e. a cloud of moisture containing nutrients with air, is sprayed on to the roots at certain intervals.

Thus, any seed to be germinated and grown by the present method may be provided embedded in a seed cartridge, which is generally composed of a material firm enough to hold the seed. In addition, the material should have porosity and water-retention characteristics which allow a liquid nutrient solution to flow to plant roots but which prevent the roots from being constantly immersed in the solution, such constant immersion predisposing the roots to rotting.

The form and dimensions of the seed cartridge may vary but it is typically a cylinder. The cartridge may be composed of a variety of different materials as readily understood by a skilled person. Non-limiting examples of suitable non-organic materials include mineral wool or mineral fibres, such as rock wool or stone wool, comprising e.g. basalt or perlite. However, rock wool is a preferred material. Another preferred material is sphagnum moss owing to its antiseptic and antibacterial properties. Also other organic materials, e.g. wood fibres, linen fibres, coir etc. may be used.

If desired, the top surface of the seed cartridge may comprise an opaque or non-transparent cover. One of the purposes of the cover is to prevent algae and mould from growing on top of the seed cartridge when exposed to light and humidity. Another purpose is to maintain appropriate moisture in the seed cartridge and, thus, prevent the seed from drying during germination. These aspects are particularly important when growing seeds with a long germination period. The cover may be made of a water-dispersible material, such as a tissue paper, which does not prevent the developing plant from growing through.

Growing plants from seeds may be divided into distinct phases. As used herein, the first phase is called "germination", a process by which the seed develops into a seedling. Generally, germination starts when a seed is provided with water. As a result, hydrolytic enzymes become active and they start breaking down food reserves, such as starch, proteins, or oils, stored in the seed into energy for the growth process and metabolically useful chemicals. In addition, the uptake of water leads to the swelling and the breaking of the seed coat. The first part of the seedling to emerge from the seed coat is the root followed by the shoot and, eventually, the seed leaves (i.e. cotyledons). By this time, the seed's food reserves are typically exhausted and future energy needed for continued growth is to be provided by photosynthesis. As used herein, the emergence of the seed leaves ends the germination phase. A typical, non-limiting example of the duration of the germination phase is from about seven to about ten days.

The second phase of plant growth is called "a seedling phase" and, as used herein, it spans from the emergence of the seed leaves to the seedling height of about a couple of centimeters, such as three centimeters. The exact measure may vary depending e.g. on the plant species, as readily understood by a skilled person. In any case, all seedlings are rich in nutrients and they are often regarded as a culinary delight.

The next growth phases in the life of a plant are called "a vegetative phase" and "a strong vegetative phase". Distinguishing these two growth phases is based on growth rates. During the early vegetative phase, i.e. the lag phase, the rate of plant growth is slow. However, during the strong vegetative phase, the growth rate increases rapidly at an exponential rate. During these two phases, plants are very active in photosynthesis in order to grow as much as possible before the onset of the next phase which, depending on the plant to be grown, is either a flowering phase, a generative phase, or a preservation phase. It is apparent to a person skilled in the art through which appropriate phases a plant is to be grown.

Sometimes it may be difficult to draw any exact lines between the strong vegetative phase, the flowering phase and the generative phase. For instance, different parts of a plant may be in a different growth phase and, depending on the species, the first weeks of the flowering phase may in fact be more a vegetative phase with rapid elongation and growth of stems and leaves.

As used herein, the term "generative phase" refers to a growth phase wherein the plant's energy is primarily directed toward creating fruit. Thus, including this phase in the present method applies in particular to vegetable-like fruits such as tomato, cucumber, paprika, and chili pepper.

As used herein, the term "preservation phase" refers to a stationary phase wherein the plant no longer elongates significantly. This phase may also be called as "uphold" or "harvesting" phase.

The present growing method may include all the above-mentioned phases or only some of them. In other words, the method may be consist of the germination phase only or it may comprise the phases from germination to either seedling phase, early vegetative phase, strong vegetative phase, or flowering or preservation phase. Accordingly, the present method may be used to obtain germinated seeds, sprouts, seedlings or mature plants. In each case, the starting material for the present method is a plant seed, preferably provided in a seed cartridge.

Plants need energy for their growth and development. The energy is obtained from sunlight through photosynthesis, which is a method where chlorophyll, i.e. green pigment found in plants, uses light energy to convert water and carbon dioxide into simple sugars and oxygen. These simple sugars are then used to make more complex sugars and starches to be utilized as energy reserves or structural components of the plant. For photosynthesis, plants are able to use sunlight in the 400 to 700 nanometer wavelength range, which corresponds more or less with the range of light visible to the human eye. This portion of the spectrum is known as photosynthetically active radiation (PAR) and it accounts for only 37% of solar energy, 62% of solar energy being within infrared wavelength (>700 nm) and the remaining 1% within ultraviolet wavelength (200 to 400 nm).

In plants, chlorophyll a is the major pigment involved in photosynthesis, while chlorophyll b acts as an accessory pigment and broadens the spectrum of light absorbed during photosynthesis. Photosynthetic plant pigments and absorption spectra thereof are summarized in Table 1 and FIG. 1. Chlorophyll a has an absorption peak at a wavelength of about 400 to 450 nm and at 650 to 700 nm; chlorophyll b at 450 to 500 nm and at 600 to 650 nm. The blue spectrum, i.e. about 400 to 500 nm, more specifically about 420 to about 480 nm, is primarily responsible for vegetative leaf growth. The red spectrum, i.e. about 600 to 700 nm, more specifically about 640 to about 690 nm, in turn, is particularly important for germination and root development. Furthermore, red light, when combined with blue light, encourages flowering. On the other hand, plants do not absorb well in the green-yellow region but, instead, reflect it. This is the reason why plants appear green to the human eye.

TABLE 1

Summary of photosynthetic pigments and effects of blue, green, and red spectrum of light

| Pigment | Characteristic absorption peak | | Occurrence |
|---|---|---|---|
| | In organic solvents, nm | In cells, nm | |
| Chlorophyl a | 420, 660 | 435, 670-680 (several forms) | All photosyntehesizing plants (except bacteria) |
| Chlorophyl b | 453, 643 | 480, 650 | Higher plants and green algae |
| Chlorophyl c | 445, 625 | Red band at 645 | Diatoms and red algae |
| Chlorophyl d | 450, 690 | Red band at 740 | Reported in some red algae |
| α carotene | 420, 440, 470 | | Many leaves, and certain algae |
| β carotene | 425, 450, 480 | | Main carotene of all other plants |
| γ carotene | 440, 460, 495 | | Traces in some plants |
| Violaxanthin | 425, 450, 475 | | Second major carotenol of leaves |
| Luteol | 420, 440, 470 | | Many leaves and certain algae |
| 400-480 | Blue spectrum | | Thickens plant leaves and enhances pigmentation, vegetative growth, antioxidant content, and flavour |

TABLE 1-continued

Summary of photosynthetic pigments and effects of blue, green, and red spectrum of light

| | Characteristic absorption peak | | |
|---|---|---|---|
| Pigment | In organic solvents, nm | In cells, nm | Occurrence |
| | 510 | Green spectrum | Quoantum absorption in the green spectrum. Little absorption in the yellow spectrum |
| | 640-680 | Red spectrum | Chlorophyl absorption peaks. Speeds up seed germination and flower/bud onset. Make plants moister |

In accordance with the above, the present method utilizes one or more artificial light sources, such as light emitting diodes (LEDs), designed to stimulate plant growth and development by emitting an electromagnetic spectrum appropriate for photosynthesis. Although plants do not absorb green light well, green spectrum, i.e. about 500 to 600 nm, more specifically about 510 to about 540 nm, may be used, particularly in the vegetative growth and maintenance phases of the present method, to intensify the green color reflected by the plants. Including the green spectrum in the plant lights is particularly important for providing an overall lighting color that is pleasant and esthetic to the human eye. It has been established that humans do not feel great in blue-red lighting conditions. Thus, green light is important for wellbeing of humans.

Chlorophyl b absorbs yellow-orange light to some extent. Thus, if desired, the plant lights to be used in the present method may also comprise yellow spectrum, i.e. about 560 to about 620 nm.

Artificial light sources to be used in the present method may be provided in a light unit positioned adjustably above the plants to be grown.

In a preferred embodiment, separate LEDs may be used for each of the spectral ranges of light to be utilized in any desired combination in the present method. In a more preferred embodiment, each plant is grown under a red light emitting LED, a blue light emitting LED, and a green light emitting LED whose mutual proportional levels of photoradiation may be adjusted depending on the growth phase and/or the needs of the plant being cultivated. The spectral characteristics of the lights may be adjusted either linearly or stepwise.

The wavelength of the light emitted by LEDs, and thus the light's color, is adjustable by controlling the current through the LED. The LED's peak wavelength may be shifted within the limits of LED technology. Thus, LEDs having different dominant wavelengths may be adjusted to jointly cover a spectral range between the dominant wavelengths, and wider.

In addition to a proper spectral range, an artificial light source for plants must also provide adequate light intensity in order to meet the plant's requirements. In LED technology, the intensity of the light emitted is adjustable by controlling the voltage through the LED, as is well known in the art.

Photosynthetically active radiation (PAR) is normally quantified as µmol photons $m^{-2}$ $s^{-1}$ (micromoles of photons per square meter per second), which is a measure of the photosynthetic photon flux density (PPFD). In southern hemisphere, full sunlight at noon during summer is about 2000 PPFD, and about 1000 PPFD during winter. Typically, plants require PPFD of about 200 to about 700 µmol $m^{-2}$ $s^{-1}$ for their growth and development. To be more specific, many leafy greens such as lettuce, salads, and herbs require PPFD of about 200 to about 400 µmol $m^{-2}$ $s^{-1}$, whereas many vegetable-like fruits or other plants requiring intensive light, such as tomato, chili, paprika, and medicinal cannabis require PPFD of about 400 to about 700 µmol $m^{-2}$ $s^{-1}$. Notably, typical lighting conditions indoors equal to about 15 µmol $m^{-2}$ $s^{-1}$. Thus, sufficient light intensity provided by the artificial light source is important for growing healthy and sturdy mature plants with delicious taste or extensive blooming. However, many of the currently available indoor gardening devices do not fulfil the requirement of sufficient light intensity.

In the present method, PPFD of about 100 to about 400 µmol $m^{-2}$ $s^{-1}$ is used for many leafy greens, herbs, flowers etc. depending on the growth stage and/or the requirements of the plant to be grown. In some preferred embodiments, PPFD of about 40 to about 140 µmol $m^{-2}$ $s^{-1}$ is used in the germination phase, PPFD of about 190 to about 370 µmol $m^{-2}$ $s^{-1}$ in the seedling phase, PPFD of about 210 to about 410 µmol $m^{-2}$ $s^{-1}$ in the early vegetative phase, PPFD of about 230 to about 450 µmol $m^{-2}$ $s^{-1}$ in the strong vegetative phase, PPFD of about 240 to about 460 µmol $m^{-2}$ $s^{-1}$ in the possible flowering phase, PPFD of about 240 to about 460 µmol $m^{-2}$ $s^{-1}$ in the possible generative phase and/or PPFD of about 30 to about 140 µmol $m^{-2}$ $s^{-1}$ in the preservation phase. Non-limiting examples of preferred and more preferred ratios between different light spectrums are shown in Table 2.

TABLE 2

Preferred light parameters in different growth phases of leafy greens, herbs, and flowers

| Light | Germination phase, µmol $m^{-2}s^{-1}$ | Seedling phase, µmol $m^{-2}s^{-1}$ | Early vegetative phase, µmol $m^{-2}s^{-1}$ | Vegetative phase, µmol $m^{-2}s^{-1}$ | Flowering phase/ generative phase, µmol $m^{-2}s^{-1}$ | Preservation phase, µmol $m^{-2}s^{-1}$ |
|---|---|---|---|---|---|---|
| total µmol $m^{-2}s^{-1}$ | 40-140 | 190-370 | 210-410 | 230-450 | 240-460 | 30-140 |
| Red spectrum (640-690 nm) | 20-60, preferably 30-40 | 70-110, preferably 90-110 | 80-120, preferably 90-110 | 60-120, preferably 80-100 | 100-160, preferably 90-100 | 10-50, preferably 20-30 |
| Green spectrum | 0 | 30-70, preferably | 30-80, preferably | 30-80, preferably | 30-80, preferably | 10-40, preferably |

TABLE 2-continued

Preferred light parameters in different growth phases of leafy greens, herbs, and flowers

| Light | Germination phase, $\mu mol\ m^{-2}s^{-1}$ | Seedling phase, $\mu mol\ m^{-2}s^{-1}$ | Early vegetative phase, $\mu mol\ m^{-2}s^{-1}$ | Vegetative phase, $\mu mol\ m^{-2}s^{-1}$ | Flowering phase/ generative phase, $\mu mol\ m^{-2}s^{-1}$ | Preservation phase, $\mu mol\ m^{-2}s^{-1}$ |
|---|---|---|---|---|---|---|
| (510-540 nm) | | 30-60 | 40-60 | 40-60 | 40-60 | 20-30 |
| Blue spectrum (400-480 nm) | 20-80, preferably 50-60 | 90-170, preferably 120-160 | 100-180, preferably 120-170 | 120-190, preferably 140-180 | 90-160, preferably 120-170 | 10-50, preferably 20-30 |
| Fully optional: Yellow spectrum (560-620 nm) | 0 | 0-20 | 0-30 | 20-60, preferably 30-50 | 20-60, preferably 30-50 | 0 |

In the present method, PPFD of about 300 to about 700 $\mu mol\ m^{-2}\ s^{-1}$ is used for many vegetable-like fruits and other plants requiring intensive light depending on the growth stage and/or the requirements of the plant to be grown. In some preferred embodiments, PPFD of about 40 to about 140 $\mu mol\ m^{-2}\ s^{-1}$ is used in the germination phase, PPFD of about 300 to about 450 $\mu mol\ m^{-2}\ s^{-1}$ in the seedling phase, PPFD of about 300 to about 450 $\mu mol\ m^{-2}\ s^{-1}$ in the early vegetative phase, PPFD of about 350 to about 700 $\mu mol\ m^{-2}\ s^{-1}$ in the strong vegetative phase, PPFD of about 350 to about 700 $\mu mol\ m^{-2}\ s^{-1}$ in the possible flowering phase, PPFD of about 300 to about 450 $\mu mol\ m^{-2}\ s^{-1}$ in the possible generative phase, and/or PPFD of about 30 to about 140 $\mu mol\ m^{-2}\ s^{-1}$ in the preservation phase. Non-limiting examples of preferred and more preferred ratios between different light spectrums are shown in Table 3.

A further parameter affecting plants' growth and development is the "duration of light" which refers to the period of time in 24 hours that plants are exposed to light. Typically but not necessarily, the duration of light in the present growing method may vary from 12 to 24 hours depending on different variable such as the plant species and the growth phase in question. In some preferred embodiments the duration of light may vary independently from about 12 to about 16 hours in the germination phase, from about 16 to about 24 hours in the seedling phase, from about 16 to about 24 hours in the early vegetative phase, from about 16 to about 24 hours in the strong vegetative phase, from about 16 to about 24 hours in the flowering phase (if applicable) and/or from about 12 to about 16 hours in the preservation phase. Non-limiting examples of plants which require long exposure to light include tomato, chili pepper, paprika and medicinal cannabis.

In the present invention, transition from a growth phase to another requires adjustments in the lights, as set forth above. The adjustments may be carried out manually or automatically in different ways. For instance, automatic adjustment may be based on measuring the height of the seedling or growing of the plant by means of machine vision, 3D measurements, infrared measurements, chlorophyl measurements, ultrasound measurements, mass measurements etc. Manual adjustment may be achieved e.g. by use of one or more extension parts, such as intelligent extension parts, which lift the light source upwards giving more space to elongating plants and, simultaneously, adjust the intensity and spectral characteristics of the artificial plant lights.

TABLE 3

Preferred light parameters in different growth phases of vegetable-like fruits and other plants requiring intensive light (e.g. tomatoes, cumber, medicinal cannabis)

| Light | Germination phase, $\mu mol\ m^{-2}s^{-1}$ | Seedling phase, $\mu mol\ m^{-2}s^{-1}$ | Early vegetative phase, $\mu mol\ m^{-2}s^{-1}$ | Vegetative phase, $\mu mol\ m^{-2}s^{-1}$ | Flowering phase (flowers only), $\mu mol\ m^{-2}s^{-1}$ | Generative phase (fruits etc), $\mu mol\ m^{-2}s^{-1}$ | Preservation phase, $\mu mol\ m^{-2}s^{-1}$ |
|---|---|---|---|---|---|---|---|
| total $\mu mol\ m^{-2}s^{-1}$ | 40-140 | 300-450 | 300-450 | 350-700 | 350-700 | 300-450 | 100-150 |
| Red spectrum (640-690 nm) | 40-80, preferably 50-60 | 100-200, preferably 100-150 | 100-200, preferably 100-150 | 150-300, preferably 160-190 | 100-160, preferably 90-100 | 100-200, preferably 100-150 | 40-80, preferably 50-60 |
| Green spectrum (510-540 nm) | 0 | 50-100, preferably 50-90 | 50-100, preferably 50-90 | 80-180, preferably 90-120 | 80-180, preferably 90-120 | 50-100, preferably 50-90 | 10-40, preferably 20-30 |
| Blue spectrum (400-480 nm) | 40-80, preferably 50-60 | 100-200, preferably 120-160 | 100-180, preferably 120-170 | 120-190, preferably 140-180 | 120-190, preferably 140-180 | 100-180, preferably 120-170 | 40-80, preferably 50-60 |
| Fully optional: Yellow spectrum (560-620 nm) | 0 | 0-20 | 0-30 | 20-60, preferably 30-50 | 20-60, preferably 30-50 | 0-30 | 0 |

Manual adjustment may be particularly desirable for education purposes. Thus, the effect of different light conditions on plant growth may be studied.

As set forth above, photosynthesis requires carbon dioxide. Typically, when the present plant growing method is carried out in a domestic environment in an open gardening device, no carbon dioxide has to be fed to the plants. This is because the end users themselves produce sufficient amount of carbon dioxide upon respiration. However, if the present method is carried out on a large scale, preferably in a closed device, the plants may be grown under about 340 to about 1000 ppm of $CO_2$. If desired, more specific values within this range may be selected independently for different growth phases.

Since the present method is to be carried out indoors, no temperature adjustments are generally necessary. However, depending on specific requirements of a plant to be grown, the present method may include heating or cooling during one or more growth phases of the present method. Some plant species, for instance, germinate better in a cool or even cold environment.

In addition to proper and adequate photoradiation, plants need water for their growth and development. In some embodiments, the present method relies on one of the basic types of hydroponics, namely ebb and flow, also called flood and drain. In this system, hydroponic solution, i.e. water and nutrients, is pumped periodically to the seed cartridges or plants to be grown and allowed to drain back to a reservoir below. This ebb and flow cycle is repeated a couple of times, e.g. two to four times, a day depending on variables such as temperature, growth phase, and specific requirements of the plant to be grown. In some preferred embodiments, irrigation is carried out from one time in two days to one time a day during the germination phase, from one to two times a day during the seedling phase, from two to six times a day during the early vegetative phase, from six to ten times a day during the strong vegetative phase, from six to ten times a day during the flowering phase and the generative phase (if applicable) and/or from three to six days during the preservation phase. However, the present method is not limited to any particular irrigation schedule.

The ebb and flow arrangement is a professional irrigation system traditionally utilized only in greenhouses. The present method, however, combines traditional hydroponics with the ebb and flow arrangement to a closed, automated system which is easy to use and suitable for end user environments.

The ebb and flow arrangement provides several advantages. For instance, the roots are not immersed in water constantly and, thus, the risk of rotting is minimized. Furthermore, as the pump is active only few times a day, the method is a silent one in contrast to many currently available home garden devices. Operation of the pump may be adjusted linearly or stepwise.

In some other embodiments, present method relies on aeroponics. In this system, aeroponic solution, i.e. water, nutrients, and air, is sprayed periodically to the seeds or the roots of the plants to be grown. The spraying interval may be adjusted freely depending on different variables, such as temperature, growth phase, and specific requirements of the plant to be grown.

As in the ebb and flow arrangement, the aeroponic arrangement provides several advantages. For instance, the roots are not immersed in water constantly and, thus, the risk of rotting is minimized. Furthermore, as the pump is active only few times a day, the method is a silent one in contrast to many currently available home garden devices. Operation of the pump may be adjusted linearly or stepwise.

The present method may involve a mechanism which alerts, e.g. by a sound or light indicator, when it is time to add water to the system.

As readily understood by a skilled person, the nutrient composition to be used in the present method may vary depending on different variables, such as the plant species to be grown and the growing phase in question. In a preferred nutrient composition, especially suitable for growing herbs, nitrogen (N), phosphorus (P), and potassium (K) are present in a ratio of 11:3:21, respectively. In general, nitrogen is important for promoting photosynthesis and the growth of leaves and vegetation; phosphorus is important for promoting root growth, flowering, and metabolic processes; while potassium is critical to plant stress tolerance and important for regulating water pressure inside and outside of plant cells. Appropriate trace elements to be included in a preferred nutrient composition are apparent to a skilled person.

Both the light and watering may be adjustable manually or automatically. Manual adjustment may be particularly desirable for education purposes. Thus, the effect of different light and watering conditions on plant growth may be studied.

Additionally, both the light and irrigation may be set on a so-called holiday mode which provides sufficient light and water to the plant to be grown so that it stays alive but does not grow significantly.

Formation of algae is a particular problem in indoor gardens. In the present method this problem may be avoided by different ways. In an embodiment, UV light is used to kill any algae formed in the reservoir of hydroponic or aeroponic solution. Since algae need light for their propagation, one way of preventing their growth is to construct the reservoir from non-transparent materials.

In general, the present method may be carried out in a device whose form and size may vary. In an embodiment, the device is a countertop garden, which is particularly suitable for domestic use. In some other embodiments, the device is a multistorey, stacked system, such as a plant factory, particularly suitable for use in environments where greater yield is desired. Non-limiting examples of such environments include restaurants and institutional kitchens.

One of the advantages of the present method is that high yields may be obtained with low carbon footprints. Thus, the present method is environmentally healthy. This is, at least partly, because the present method does not require heating, cooling, or addition of $CO_2$. The most efficient greenhouses in the world are able to produce lettuce in a yield of approximately 80 to 100 kg $m^{-2}$. The present method, in turn, may produce approximately 60 kg $m^{-2}$ of lettuce with an energy consumption of only one tenth of that of the above-mentioned world's most efficient greenhouses. In more general terms, the present method is able to produce one kg of green mass with 90% less energy than conventional greenhouses. Thus, the present method is very energy efficient and it may be used for decentralized food production in urban settings.

Another advantage of the present invention is that no pesticides or germicides are required for food production. This is because, for instance, the method is to be carried out in a closed irrigation system indoors, the irrigation system may be provided with UV sterilization, and the material of the seed cartridge, such as rock wool, is pure and germfree.

EXAMPLE

The following example was carried out in May in Southern Finland.

Figure 2:
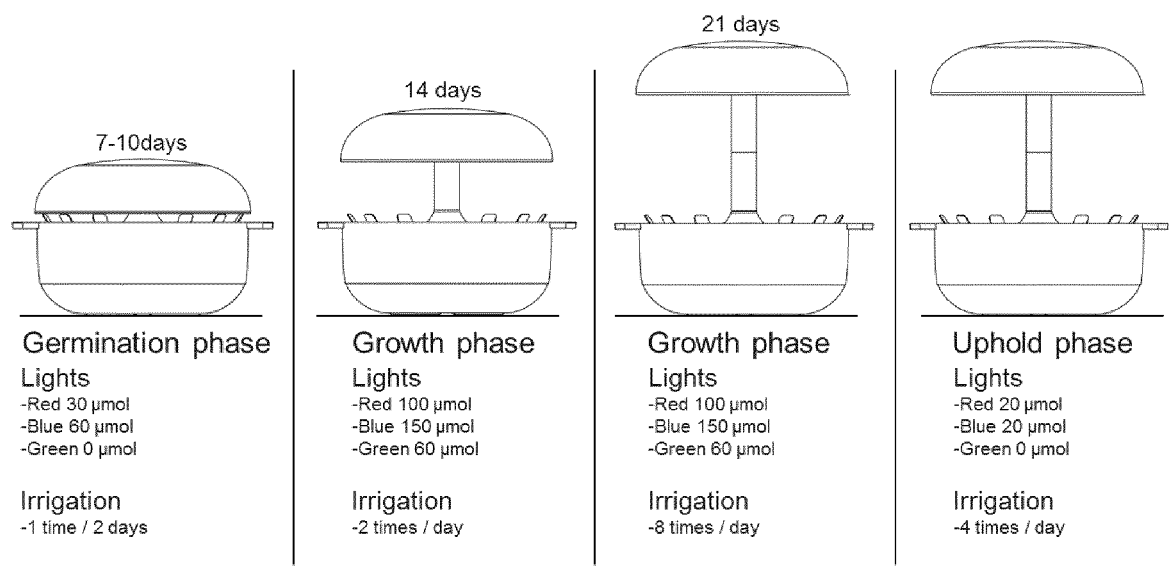
FIG. 2 shows the lighting and irrigation conditions used for growing basils according to the present method in Example.

Basil seeds were embedded in eight cartridges made of rock wool. Four of the seed cartridges were placed in a plastic container, while the remaining four seed cartridges were placed in a countertop-sized gardening device designed for carrying out the present plant growing method. The plastic container was kept on a southern windowsill while the artificial lights of the gardening device were adjusted as shown in FIG. 2.

Both systems were irrigated at the same frequencies but in the gardening device, ebb and flow irrigation was utilized.

Figure 3:
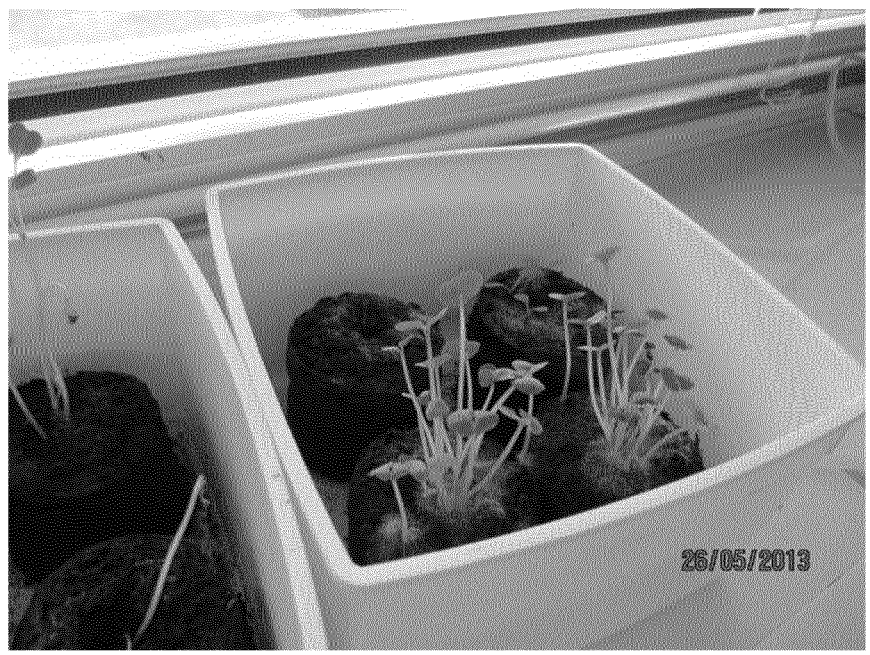
FIG. 3 is a photograph of basils being grown on a windowsill for 2.5 weeks in May in Southern Finland.
Figure 4:
FIG. 4 is a photograph of basils, the cultivation of which was initiated on the same day as in FIG. 1 but grown by the present method.

By the present method, 20 to 30% higher germination rate was achieved as compared to that obtained by the method performed on the window sill. FIGS. 3 and 4 show photographs taken 2.5 weeks after initiation of the window sill method and the present method, respectively. It is clear that the seedlings shown in FIG. 3 are not viable enough to produce harvest. On the other hand, the basil seedlings produced by the present method were strong, sturdy, vigorous and tasty already when the photographs were taken.

It will be obvious to a person skilled in the art that, as the technology advances, the inventive concept can be implemented in various ways. The invention and its embodiments are not limited to the examples described above but may vary within the scope of the claims.

The invention claimed is:

1. A hydroponic method of growing a plant from a seed indoors, comprising
   i) providing a seed;
   ii) germinating the seed under a photosynthetic photon flux density (PPFD) of 40 to 140 $\mu$mol m$^{-2}$ s$^{-1}$;
   iii) growing the germinated seed into a seedling under a PPFD of 190 to 450 $\mu$mol m$^{-2}$ s$^{-1}$;
   iv) growing the seedling into a mature plant through a vegetative phase under a PPFD of 210 to 450 $\mu$mol m$^{-2}$ s$^{-1}$, and further through a strong vegetative phase under a PPFD of 230 to 700 $\mu$mol m$^{-2}$ s$^{-1}$; and
   v) upholding the mature plant under PPFD of 30 to 150 $\mu$mol m$^{-2}$ s$^{-1}$ until harvesting.

2. The method according to claim 1, further comprising a step of growing the mature plant through a flowering phase under PPFD of 240 to 700 $\mu$mol m$^{-2}$ s$^{-1}$.

3. The method according to claim 1, further comprising a step of growing the mature plant through a generative phase under PPFD of 240 to 460 $\mu$mol m$^{-2}$ s$^{-1}$.

4. The method according to claim 1, wherein step iii) is carried out under a PPFD of 190 to 370 $\mu$mol m$^{-2}$ s$^{-1}$, step iv) is carried out under a PPFD of 210 to 410 $\mu$mol m$^{-2}$ s$^{-1}$ in the vegetative phase and further under a PPFD of 230 to 450 $\mu$mol m$^{-2}$ s$^{-1}$ in the strong vegetative phase, and step v) is carried out under PPFD of 30 to 140 $\mu$mol m$^{-2}$ s$^{-1}$.

5. The method according to claim 4, wherein
   in step ii) 20 to 60 $\mu$mol m$^{-2}$ s$^{-1}$ of the PPFD is in the red spectrum of 640 to 690 nm, and 20 to 80 $\mu$mol m$^{-2}$ s$^{-1}$ of the PPFD is in the blue spectrum of 400 to 480 nm;
   in step iii) 70 to 110 $\mu$mol m$^{-2}$ s$^{-1}$ of the PPFD is in the red spectrum of 640 to 690 nm, 90 to 170 $\mu$mol m$^{-2}$ s$^{-1}$ of PPFD is in the blue spectrum of 400 to 480 nm, 30 to 70 $\mu$mol m$^{-2}$ s$^{-1}$ of the PPFD is in the green spectrum of 510 to 540 nm, and 0 to 20 $\mu$mol m$^{-2}$ s$^{-1}$ of the PPFD is in the yellow spectrum of 560-620 nm;
   in the vegetative phase of step iv) 80 to 120 $\mu$mol m$^{-2}$ s$^{-1}$ of the PPFD is in the red spectrum of 640 to 690 nm, 100 to 180 $\mu$mol m$^{-2}$ s$^{-1}$ of the PPDF is in the blue spectrum of 400 to 480 nm, 30 to 80 $\mu$mol m$^{-2}$ s$^{-1}$ of the PPFD is in the green spectrum of 510 to 540 nm, and 0 to 30 $\mu$mol m$^{-2}$ s$^{-1}$ of the PPFD is in the yellow spectrum of 560-620 nm;
   in the strong vegetative phase of step iv) 60 to 120 $\mu$mol m$^{-2}$ s$^{-1}$ of the PPFD is in the red spectrum of 640 to 690 nm, 120 to 190 $\mu$mol m$^{-2}$ s$^{-1}$ of the PPFD is in the blue spectrum of 400 to 480 nm, 30 to 80 $\mu$mol m$^{-2}$ s$^{-1}$ of the PPFD is in the green spectrum of 510 to 540 nm; and
   in step v) 10 to 50 $\mu$mol m$^{-2}$ s$^{-1}$ of the PPFD is in the red spectrum of 640 to 690 nm, 10 to 50 $\mu$mol m$^{-2}$ s$^{-1}$ of the PPFD is in the blue spectrum of 400 to 480 nm, and 10 to 40 $\mu$mol m$^{-2}$ s$^{-1}$ of the PPFD is in the green spectrum of 510 to 540 nm.

6. The method according to claim 5, wherein in the strong vegetative phase of step iv), 20 to 60 $\mu$mol m$^{-2}$ s$^{-1}$ of the PPFD is further in the yellow spectrum of 560-620 nm.

7. The method according to claim 4, further comprising a step of growing the mature plant through a flowering phase and generative phase under PPFD of 240 to 460 $\mu$mol m$^{-2}$ s$^{-1}$.

8. The method according to claim 7, wherein 100 to 160 $\mu$mol m$^{-2}$ s$^{-1}$ of the PPFD in the flowering phase and generative phase is in the red spectrum of 640 to 690 nm, 90 to 160 $\mu$mol m$^{-2}$ s$^{-1}$ is in the blue spectrum of 400 to 480 nm, 30 to 80 $\mu$mol m$^{-2}$ s$^{-1}$ is in the green spectrum of 510 to 540 nm.

9. The method according to claim 8, wherein in the flowering phase or in the generative phase 20 to 60 $\mu$mol m$^{-2}$ s$^{-1}$ is further in the yellow spectrum of 560-620 nm.

10. The method according to claim 4, wherein the plant is a leafy green, a herb or a flower.

11. The method according to claim 1, wherein step iii) is carried out under a PPFD of 300 to 450 $\mu$mol m$^{-2}$ s$^{-1}$, step iv) is carried out under a PPFD of 300 to 450 $\mu$mol m$^{-2}$ s$^{-1}$ in the vegetative phase and further under a PPFD of 300 to 700 $\mu$mol m$^{-2}$ s$^{-1}$ in the strong vegetative phase, and step v) is carried out under PPFD of 100 to 150 $\mu$mol m$^{-2}$ s$^{-1}$.

12. The method according to claim 11, wherein
   in step iii) 100 to 200 $\mu$mol m$^{-2}$ s$^{-1}$ of the PPFD is in the red spectrum of 640 to 690 nm, 100 to 200 $\mu$mol m$^{-2}$ s$^{-1}$ of PPFD is in the blue spectrum of 400 to 480 nm, 50 to 100 $\mu$mol m$^{-2}$ s$^{-1}$ of the PPFD is in the green spectrum of 510 to 540 nm, and 0 to 20 $\mu$mol m$^{-2}$ s$^{-1}$ of the PPFD is in the yellow spectrum of 560-620 nm in such a manner that the total of the PPFD is 300 to 450 $\mu$mol m$^{-2}$ s$^{-1}$;
   in the vegetative phase of step iv) 100 to 200 $\mu$mol m$^{-2}$ s$^{-1}$ of the PPFD is in the red spectrum of 640 to 690 nm, 100 to 180 $\mu$mol m$^{-2}$ s$^{-1}$ of the PPDF is in the blue spectrum of 400 to 480 nm, 50 to 100 $\mu$mol m$^{-2}$ s$^{-1}$ of the PPFD is in the green spectrum of 510 to 540 nm, and 0 to 30 $\mu$mol m$^{-2}$ s$^{-1}$ of the PPFD is in the yellow spectrum of 560-620 nm in such a manner that the total of the PPFD is 300 to 450 $\mu$mol m$^{-2}$ s$^{-1}$;
   in the strong vegetative phase of step iv) 150 to 300 $\mu$mol m$^{-2}$ s$^{-1}$ of the PPFD is in the red spectrum of 640 to 690 nm, 120 to 190 $\mu$mol m$^{-2}$ s$^{-1}$ of the PPFD is in the blue spectrum of 400 to 480 nm, 80 to 180 $\mu$mol m$^{-2}$ s$^{-1}$ of the PPFD is in the green spectrum of 510 to 540 nm in such a manner that the total of the PPFD is 300 to 700 $\mu$mol m$^{-2}$ s$^{-1}$; and
   in step v) 40 to 80 $\mu$mol m$^{-2}$ s$^{-1}$ of the PPFD is in the red spectrum of 640 to 690 nm, 40 to 80 $\mu$mol m$^{-2}$ s$^{-1}$ of the PPFD is in the blue spectrum of 400 to 480 nm, and 10 to 40 $\mu$mol m$^{-2}$ s$^{-1}$ of the PPFD is in the green spectrum of 510 to 540 nm in such a manner that the total of the PPFD is 100 to 150 $\mu$mol m$^{-2}$ s$^{-1}$.

13. The method according to claim 12, wherein in the strong vegetative phase of step iv), 20 to 60 μmol m$^{-2}$ s$^{-1}$ of the PPFD is further in the yellow spectrum of 560-620 nm.

14. The method according to claim 11, further comprising a step of growing the mature plant through a flowering phase under PPFD of 350 to 700 μmol m$^{-2}$ s$^{-1}$ of the PPFD is in the red spectrum of 640 to 690 nm, 120 to 190 μmol m$^{-2}$ s$^{-1}$ is in the blue spectrum of 400 to 480 nm, 80 to 180 μmol m$^{-2}$ s$^{-1}$ is in the green spectrum of 510 to 540 nm.

15. The method according to claim 14, wherein in the strong vegetative phase of step iv), 20 to 60 μmol m$^{-2}$ s$^{-1}$ of the PPFD is further in the yellow spectrum of 560-620 nm.

16. The method according to claim 11, further comprising a step of growing the mature plant through a generative phase under PPFD of 300 to 450 μmol m$^{-2}$ s$^{-1}$ of the PPFD is in the red spectrum of 640 to 690 nm, 100 to 180 μmol m$^{-2}$ s$^{-1}$ is in the blue spectrum of 400 to 480 nm, 50 to 100 μmol m$^{-2}$ s$^{-1}$ is in the green spectrum of 510 to 540 nm, and, 0 to 30 μmol m$^{-2}$ s$^{-1}$ is in the yellow spectrum of 560-620 nm.

17. The method according to claim 11, wherein the plant is a vegetable-like fruit or other plant requiring intensive light.

18. The method according to claim 1, wherein the seed is provided in a seed cartridge.

19. The method according to claim 1, wherein the seed or plant to be grown is watered by the ebb and flow phenomenon.

20. The method according to claim 1, wherein the seed or plant to be grown is watered aeroponically.

\* \* \* \* \*